United States Patent
Dravneek et al.

(10) Patent No.: US 10,080,132 B2
(45) Date of Patent: Sep. 18, 2018

(54) SYSTEM FOR ADAPTATION OF MULTIPLE DIGITAL SIGNATURES IN A DISTRIBUTED NETWORK

(71) Applicant: BANK OF AMERICA CORPORATION, Charlotte, NC (US)

(72) Inventors: Victoria L. Dravneek, Charlotte, NC (US); Manu Jacob Kurian, Dallas, TX (US); Alicia C. Jones-McFadden, Fort Mill, SC (US); Matthew Hsieh, Charlotte, NC (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 132 days.

(21) Appl. No.: 15/082,645

(22) Filed: Mar. 28, 2016

(65) Prior Publication Data

US 2017/0280315 A1    Sep. 28, 2017

(51) Int. Cl.
*H04W 8/16* (2009.01)
*H04W 12/02* (2009.01)
(Continued)

(52) U.S. Cl.
CPC ............ *H04W 8/16* (2013.01); *H04L 47/10* (2013.01); *H04W 12/02* (2013.01); *H04W 12/06* (2013.01); *H04L 67/12* (2013.01); *H04W 4/70* (2018.02)

(58) Field of Classification Search
None
See application file for complete search history.

(56) References Cited

U.S. PATENT DOCUMENTS 5,717,923 A   2/1998   Dedrick
5,761,648 A   6/1998   Golden et al.
(Continued)

FOREIGN PATENT DOCUMENTS

CN   104283967 A   1/2015

OTHER PUBLICATIONS

Friedman, Jack P., Dictionary of Business Terms, 2000, Barron's Educational Series, Inc., 3rd edition, 225.
(Continued)

*Primary Examiner* — Andrew Lai
*Assistant Examiner* — Harry H Kim
(74) *Attorney, Agent, or Firm* — Michael A. Springs; Moore & Van Allen PLLC; James C. Edwards

(57) ABSTRACT

The present invention provides for managing communication of data from Internet-connected devices, such as those devices within an IoT environment. Specifically, the invention provides automated determination of which devices are communicating to which third-party entities and, in some embodiments, the type of data being communicated to such third-party entities. Once such information is known, the third-party entity can be automatically placed into a designated third-party category, which defines the type of data that the third-party entity is authorized to receive. In addition, a user can manage the communications from such devices by selecting to prohibit (i.e., block) or limit, based on data type, which data is communicated to which third-party entities. Additionally, the identity of the third-party entities can be authenticated/verified, such that if the third-party entity cannot be verified, communication of data to that entity is blocked or limited.

15 Claims, 2 Drawing Sheets

(51) Int. Cl.
  *H04W 12/06* (2009.01)
  *H04W 4/70* (2018.01)
  *H04L 12/801* (2013.01)
  *H04L 29/08* (2006.01)

(56) References Cited

U.S. PATENT DOCUMENTS

| | | | |
|---|---|---|---|
| 5,842,185 A | 11/1998 | Chancey et al. | |
| 5,848,396 A | 12/1998 | Gerace | |
| 5,870,770 A | 2/1999 | Wolfe | |
| 5,907,830 A | 5/1999 | Engel et al. | |
| 5,911,135 A | 6/1999 | Atkins | |
| 5,933,811 A | 8/1999 | Angles et al. | |
| 6,006,252 A | 12/1999 | Wolfe | |
| 6,009,411 A | 12/1999 | Kepecs | |
| 6,009,413 A | 12/1999 | Webber et al. | |
| 6,041,309 A | 3/2000 | Laor | |
| 6,055,573 A | 4/2000 | Gardenswartz et al. | |
| 6,076,069 A | 6/2000 | Laor | |
| 6,223,163 B1 | 4/2001 | Van Luchene | |
| 6,263,351 B1 | 7/2001 | Wolfe | |
| 6,282,567 B1 | 8/2001 | Finch, II et al. | |
| 6,292,786 B1 | 9/2001 | Deaton et al. | |
| 6,292,813 B1 | 9/2001 | Wolfe | |
| 6,317,718 B1 | 11/2001 | Fano | |
| 6,321,208 B1 | 11/2001 | Barnett et al. | |
| 6,330,543 B1 | 12/2001 | Kepecs | |
| 6,332,126 B1 | 12/2001 | Peirce et al. | |
| 6,336,099 B1 | 1/2002 | Barnett et al. | |
| 6,336,131 B1 | 1/2002 | Wolfe | |
| 6,341,305 B2 | 1/2002 | Wolfe | |
| 6,349,290 B1 | 2/2002 | Horowitz et al. | |
| 6,385,592 B1 | 5/2002 | Angles et al. | |
| 6,434,534 B1 | 8/2002 | Walker et al. | |
| 6,505,168 B1 | 1/2003 | Rothman et al. | |
| 6,611,814 B1 | 8/2003 | Lee et al. | |
| 6,615,184 B1 | 9/2003 | Hicks | |
| 6,622,174 B1 | 9/2003 | Ukita et al. | |
| 6,678,685 B2 | 1/2004 | McGill et al. | |
| 6,782,370 B1 | 8/2004 | Stack | |
| 6,853,291 B1 | 2/2005 | Aisa | |
| 6,865,545 B1 | 3/2005 | Epstein et al. | |
| 6,906,617 B1 | 6/2005 | Van der Meulen | |
| 6,925,444 B1 | 8/2005 | McCollom et al. | |
| 6,937,995 B1 | 8/2005 | Kepecs | |
| 7,024,374 B1 | 4/2006 | Day et al. | |
| 7,043,526 B1 | 5/2006 | Wolfe | |
| 7,096,193 B1 | 8/2006 | Beaudoin et al. | |
| 7,099,832 B2 | 8/2006 | Walker et al. | |
| 7,124,096 B2 | 10/2006 | Dutta et al. | |
| 7,127,414 B1 | 10/2006 | Awadallah et al. | |
| 7,162,443 B2 | 1/2007 | Shah | |
| 7,181,488 B2 | 2/2007 | Martin et al. | |
| 7,225,167 B2 | 5/2007 | Hind et al. | |
| 7,231,357 B1 | 6/2007 | Shanman et al. | |
| 7,236,942 B1 | 6/2007 | Walker et al. | |
| 7,246,310 B1 | 7/2007 | Wolfe | |
| 7,249,058 B2 | 7/2007 | Kim et al. | |
| 7,254,548 B1 | 8/2007 | Tannenbaum | |
| 7,257,604 B1 | 8/2007 | Wolfe | |
| 7,299,007 B2 | 11/2007 | Eskin | |
| 7,302,429 B1 | 11/2007 | Wanker | |
| 7,302,638 B1 | 11/2007 | Wolfe | |
| 7,315,834 B2 | 1/2008 | Martineau et al. | |
| 7,324,965 B2 | 1/2008 | Martineau et al. | |
| 7,340,419 B2 | 3/2008 | Walker et al. | |
| 7,356,490 B1 | 4/2008 | Jacobi et al. | |
| 7,386,477 B2 | 6/2008 | Fano | |
| 7,398,248 B2 | 7/2008 | Phillips et al. | |
| 7,412,604 B1 | 8/2008 | Doyle | |
| 7,433,874 B1 | 10/2008 | Wolfe | |
| 7,464,050 B1 | 12/2008 | Deaton et al. | |
| 7,472,088 B2 | 12/2008 | Taylor et al. | |
| 7,490,056 B2 | 2/2009 | Nash | |
| 7,512,551 B2 | 3/2009 | Postrel | |
| 7,536,385 B1 | 5/2009 | Wolfe | |
| 7,552,080 B1 | 6/2009 | Willard et al. | |
| 7,578,435 B2 | 8/2009 | Suk | |
| 7,593,862 B2 | 9/2009 | Mankoff | |
| 7,599,850 B1 | 10/2009 | Laor | |
| 7,606,736 B2 | 10/2009 | Martineau et al. | |
| 7,860,792 B1 | 12/2010 | Magruder et al. | |
| 7,925,579 B1 | 4/2011 | Flaxman et al. | |
| 8,042,178 B1 | 10/2011 | Fisher et al. | |
| 8,234,194 B2 | 7/2012 | Mele et al. | |
| 8,301,558 B2 | 10/2012 | Marshall et al. | |
| 8,442,894 B2 | 5/2013 | Blackhurst et al. | |
| 8,495,072 B1 | 7/2013 | Kapoor et al. | |
| 8,930,265 B2 | 1/2015 | Blackhurst et al. | |
| 8,964,113 B2 | 2/2015 | Kannermark et al. | |
| 8,984,113 B2 | 3/2015 | Li et al. | |
| 9,009,828 B1 | 4/2015 | Ramsey et al. | |
| 9,032,077 B1 | 5/2015 | Klein et al. | |
| 9,043,879 B1 | 5/2015 | Reeves et al. | |
| 9,104,189 B2 | 8/2015 | Berges Gonzalez et al. | |
| 9,106,615 B2 | 8/2015 | Grossman | |
| 9,338,181 B1 | 5/2016 | Burns et al. | |
| 9,411,982 B1 | 8/2016 | Dippenaar et al. | |
| 9,743,272 B1 | 8/2017 | Ogrinz et al. | |
| 9,775,131 B2 | 9/2017 | Winand et al. | |
| 9,843,624 B1 | 12/2017 | Taaghol et al. | |
| 9,874,923 B1 | 1/2018 | Brown et al. | |
| 9,946,571 B1 | 4/2018 | Brown et al. | |
| 2002/0032626 A1 | 3/2002 | DeWolf et al. | |
| 2002/0049624 A1 | 4/2002 | Raveis, Jr. | |
| 2002/0052803 A1 | 5/2002 | Amidhozour et al. | |
| 2002/0062249 A1 | 5/2002 | Iannacci | |
| 2002/0072975 A1 | 6/2002 | Steele et al. | |
| 2002/0091571 A1 | 7/2002 | Thomas et al. | |
| 2002/0114433 A1 | 8/2002 | Katou et al. | |
| 2002/0143564 A1 | 10/2002 | Webb et al. | |
| 2002/0190118 A1 | 12/2002 | Davenport et al. | |
| 2004/0122736 A1 | 6/2004 | Strock et al. | |
| 2004/0192339 A1 | 9/2004 | Wilson et al. | |
| 2004/0226995 A1 | 11/2004 | Smith | |
| 2004/0230593 A1 | 11/2004 | Rudin et al. | |
| 2004/0249768 A1 | 12/2004 | Kontio et al. | |
| 2005/0015624 A1 | 1/2005 | Ginter et al. | |
| 2005/0039053 A1 | 2/2005 | Walia | |
| 2005/0075975 A1 | 4/2005 | Rosner et al. | |
| 2005/0171845 A1 | 8/2005 | Halfman et al. | |
| 2005/0173517 A1 | 8/2005 | Suk et al. | |
| 2005/0177437 A1 | 8/2005 | Ferrier | |
| 2005/0221842 A1 | 10/2005 | Kaneko et al. | |
| 2005/0286079 A1 | 12/2005 | Takagi | |
| 2005/0288955 A1 | 12/2005 | Lewiss-Hachmeister | |
| 2006/0151598 A1 | 7/2006 | Chen et al. | |
| 2006/0217113 A1 | 9/2006 | Rao et al. | |
| 2007/0005426 A1 | 1/2007 | Walker et al. | |
| 2007/0092114 A1 | 4/2007 | Ritter et al. | |
| 2007/0127470 A1 | 6/2007 | Gaedeken et al. | |
| 2007/0136418 A1 | 6/2007 | Wolfe | |
| 2007/0255620 A1 | 11/2007 | Tumminaro et al. | |
| 2007/0260532 A1 | 11/2007 | Blake, III | |
| 2007/0299677 A1 | 12/2007 | Maertz | |
| 2008/0009268 A1* | 1/2008 | Ramer | G06F 17/30867 455/412.1 |
| 2008/0021767 A1 | 1/2008 | Benson et al. | |
| 2008/0040417 A1 | 2/2008 | Juncker | |
| 2008/0091535 A1 | 4/2008 | Heiser et al. | |
| 2008/0133336 A1 | 6/2008 | Altman et al. | |
| 2008/0162224 A1 | 7/2008 | Coon et al. | |
| 2008/0162316 A1 | 7/2008 | Rampell et al. | |
| 2008/0192677 A1* | 8/2008 | Abusch-Magder | H04W 8/082 370/328 |
| 2008/0221986 A1 | 9/2008 | Soicher et al. | |
| 2008/0228600 A1 | 9/2008 | Treyz et al. | |
| 2008/0235130 A1 | 9/2008 | Malov et al. | |
| 2008/0249936 A1 | 10/2008 | Miller et al. | |
| 2008/0249941 A1 | 10/2008 | Cooper | |
| 2008/0277465 A1 | 11/2008 | Pletz et al. | |
| 2008/0301779 A1 | 12/2008 | Garg et al. | |
| 2009/0006175 A1 | 1/2009 | Maertz | |
| 2009/0043629 A1 | 2/2009 | Price | |

(56) References Cited

U.S. PATENT DOCUMENTS

| | | |
|---|---|---|
| 2009/0094125 A1 | 4/2009 | Killian et al. |
| 2009/0132366 A1 | 5/2009 | Lam et al. |
| 2009/0132415 A1 | 5/2009 | Davis et al. |
| 2009/0150238 A1 | 6/2009 | Marsh et al. |
| 2009/0170483 A1 | 7/2009 | Barnett et al. |
| 2009/0172728 A1 | 7/2009 | Shkedi et al. |
| 2009/0187436 A1 | 7/2009 | Shoen et al. |
| 2009/0187543 A1 | 7/2009 | Samborn |
| 2009/0271265 A1 | 10/2009 | Lay et al. |
| 2009/0292599 A1 | 11/2009 | Rampell et al. |
| 2009/0292647 A1 | 11/2009 | Porat et al. |
| 2009/0299865 A1 | 12/2009 | Budgen |
| 2009/0313106 A1 | 12/2009 | Taylor et al. |
| 2009/0319638 A1 | 12/2009 | Faith et al. |
| 2010/0106568 A1 | 4/2010 | Grimes |
| 2010/0131395 A1 | 5/2010 | Allin et al. |
| 2010/0189227 A1 | 7/2010 | Mannar et al. |
| 2010/0250538 A1 | 9/2010 | Richards et al. |
| 2010/0274731 A1 | 10/2010 | Tsitsis |
| 2010/0306763 A1 | 12/2010 | Lambert et al. |
| 2011/0040785 A1 | 2/2011 | Steenberg et al. |
| 2011/0087547 A1 | 4/2011 | Amaro et al. |
| 2011/0182280 A1 | 7/2011 | Charbit et al. |
| 2011/0191149 A1 | 8/2011 | Blackhurst et al. |
| 2011/0191150 A1 | 8/2011 | Blackhurst et al. |
| 2011/0191160 A1 | 8/2011 | Blackhurst et al. |
| 2011/0191173 A1 | 8/2011 | Blackhurst et al. |
| 2011/0191177 A1 | 8/2011 | Blackhurst et al. |
| 2011/0191180 A1 | 8/2011 | Blackhurst et al. |
| 2011/0191181 A1 | 8/2011 | Blackhurst et al. |
| 2011/0191184 A1 | 8/2011 | Blackhurst et al. |
| 2011/0191238 A1 | 8/2011 | Blackhurst et al. |
| 2011/0238499 A1 | 9/2011 | Blackhurst et al. |
| 2011/0238550 A1 | 9/2011 | Reich et al. |
| 2011/0270773 A1 | 11/2011 | Siekman et al. |
| 2011/0302201 A1 | 12/2011 | Ogaz et al. |
| 2012/0016803 A1 | 1/2012 | Tharp |
| 2012/0028635 A1 | 2/2012 | Borg et al. |
| 2012/0030092 A1 | 2/2012 | Marshall et al. |
| 2012/0190386 A1 | 7/2012 | Anderson |
| 2012/0290230 A1 | 11/2012 | Berges Gonzalez et al. |
| 2013/0006813 A1 | 1/2013 | Carlin et al. |
| 2013/0046626 A1 | 2/2013 | Grigg et al. |
| 2013/0079931 A1 | 3/2013 | Wanchoo et al. |
| 2013/0096857 A1 | 4/2013 | Chakradhar |
| 2013/0110621 A1 | 5/2013 | Gupta et al. |
| 2013/0132854 A1 | 5/2013 | Raleigh et al. |
| 2013/0185558 A1 | 7/2013 | Seibert et al. |
| 2013/0298242 A1 | 11/2013 | Kumar et al. |
| 2013/0307702 A1 | 11/2013 | Pal et al. |
| 2014/0006529 A1 | 1/2014 | Andreoli-Fang et al. |
| 2014/0047322 A1 | 2/2014 | Kim et al. |
| 2014/0068721 A1 | 3/2014 | Ong et al. |
| 2014/0115324 A1 | 4/2014 | Buer |
| 2014/0226010 A1 | 8/2014 | Molin et al. |
| 2014/0244834 A1 | 8/2014 | Guedalia et al. |
| 2014/0278629 A1 | 9/2014 | Stephenson et al. |
| 2014/0344128 A1 | 11/2014 | Nikankin et al. |
| 2015/0002271 A1 | 1/2015 | Lee et al. |
| 2015/0013001 A1 | 1/2015 | Lee et al. |
| 2015/0081860 A1 | 3/2015 | Kuehnel et al. |
| 2015/0094026 A1 | 4/2015 | Martin |
| 2015/0094093 A1 | 4/2015 | Pierce et al. |
| 2015/0095478 A1 | 4/2015 | Zuerner |
| 2015/0221039 A1 | 8/2015 | Johansson |
| 2015/0227406 A1 | 8/2015 | Jan et al. |
| 2015/0293574 A1 | 10/2015 | Ehsan et al. |
| 2015/0294553 A1 | 10/2015 | Logan et al. |
| 2015/0312348 A1 | 10/2015 | Lustgarten |
| 2015/0327071 A1 | 11/2015 | Sharma et al. |
| 2015/0358317 A1 | 12/2015 | Deutschmann et al. |
| 2016/0065628 A1 | 3/2016 | Guo et al. |
| 2016/0071334 A1 | 3/2016 | Johnson et al. |
| 2016/0087933 A1* | 3/2016 | Johnson ............... H04W 4/70 709/245 |
| 2016/0110811 A1 | 4/2016 | Siu et al. |
| 2016/0132832 A1 | 5/2016 | Pinkovezky et al. |
| 2016/0164919 A1 | 6/2016 | Satish et al. |
| 2016/0210450 A1 | 7/2016 | Su |
| 2016/0217282 A1 | 7/2016 | Vecera et al. |
| 2016/0232336 A1 | 8/2016 | Pitschel et al. |
| 2016/0269411 A1 | 9/2016 | Malachi |
| 2016/0295410 A1 | 10/2016 | Gupta et al. |
| 2016/0300201 A1 | 10/2016 | Li et al. |
| 2016/0337869 A1 | 11/2016 | Dai et al. |
| 2016/0342982 A1 | 11/2016 | Thomas et al. |
| 2016/0343078 A1 | 11/2016 | Vaidyanathan et al. |
| 2016/0367415 A1 | 12/2016 | Hayes et al. |
| 2017/0004508 A1 | 1/2017 | Mansfield et al. |
| 2017/0006135 A1 | 1/2017 | Siebel et al. |
| 2017/0017354 A1 | 1/2017 | Wei |
| 2017/0041296 A1* | 2/2017 | Ford ............... H04L 63/0421 |
| 2017/0061442 A1 | 3/2017 | Barlow et al. |
| 2017/0076408 A1 | 3/2017 | D'Souza et al. |
| 2017/0124642 A1 | 5/2017 | Barnett et al. |
| 2017/0171513 A1* | 6/2017 | Nakamura ............ H04N 7/152 |
| 2017/0178186 A1 | 6/2017 | Craft |
| 2017/0208079 A1* | 7/2017 | Cammarota ............ H04L 63/10 |
| 2017/0208139 A1 | 7/2017 | Li et al. |
| 2017/0228773 A1 | 8/2017 | Takayama |
| 2017/0235454 A1 | 8/2017 | Selfridge et al. |
| 2017/0244618 A1 | 8/2017 | DeLuca et al. |
| 2017/0278133 A1 | 9/2017 | Corrado et al. |
| 2017/0280459 A1 | 9/2017 | Ogrinz |
| 2017/0302669 A1 | 10/2017 | Chen et al. |
| 2017/0323345 A1 | 11/2017 | Flowers et al. |
| 2017/0352071 A1 | 12/2017 | Carey et al. |
| 2017/0353859 A1 | 12/2017 | Idnani et al. |
| 2017/0366422 A1 | 12/2017 | Castinado et al. |
| 2017/0374583 A1 | 12/2017 | Ogrinz et al. |
| 2018/0007131 A1 | 1/2018 | Cohn et al. |

OTHER PUBLICATIONS

Guagliardo, Joseph C. et al., "Blockchain: Preparing for Disruption Like Its the 90s"; Mar. 14, 2016, retrieved from http://www.law360.com/articles/77120CVprint?section=ip.

International Preliminary Report on Patentability (IPRP) dated Jul. 31, 2012 for International Application No. PCT/US2011/022765.

International Search Report and the Written Opinion of the International Searching Authority dated Mar. 25, 2011 for International Application No. PCT/US11/22781.

International Search Report and the Written Opinion of the International Searching Authority dated Mar. 25, 2011 for International Application No. PCT/US11/22783.

International Search Report and the Written Opinion of the International Searching Authority dated Mar. 28, 2011 for International Application No. PCT/US11/22771.

International Search Report and the Written Opinion of the International Searching Authority dated Mar. 29, 2011 for International Application No. PCT/US11/22779.

International Search Report and the Written Opinion of the International Searching Authority dated Mar. 29, 2011 for International Application No. PCT/US11/22785.

International Search Report and the Written Opinion of the International Searching Authority dated Apr. 8, 2011 for International Application No. PCT/US11/22765.

\* cited by examiner

SYSTEM FOR ADAPTATION OF MULTIPLE DIGITAL SIGNATURES IN A DISTRIBUTED NETWORK

FIELD

In general, embodiments of the invention relate to managing communications and, more specifically, managing which entities and what data can be communicated from Internet-connected devices, such as devices within an Internet of Things (IoT) environment.

BACKGROUND

An increasing amount of devices within a residence, a place of business or the like may be capable of wireless connection to the Internet. Moreover, such devices include one or more sensors for capturing data and the data is then communicated, via the Internet, to a third-party entity for various purposes. Such a network environment is commonly referred to as the Internet of Things (IoT). For example, appliances (e.g., televisions, washer/dryer, refrigerators or the like) within a residence may provide for wireless Internet connectivity and may communicate data, such as performance data, warranty data, and the like to third-party entities, such as manufacturers, warranty services, exhaustible part suppliers and the like. Such communication of data by Internet-connected devices typically occurs on a continual automatic basis without the knowledge of the device users. Moreover, the user of the device has no control over which entities data is communicated to and/or what data is communicated to which entities. This can especially problematic in the instance in which a payment token/credential is communicated to merchant (e.g., for replenishing exhaustible parts in an appliance); however, for security reasons, the user does not the payment token/credential communicated along with other data to other third-party entities, such as a manufacturer, a warranty service or the like.

Therefore, a need exists to develop systems, apparatus and the like for allowing a user to customize the communication of data from Internet-connected devices, such as those devices within an IoT environment. Specifically, the desired systems, apparatus and the like should automated determination of which devices are communicating to which third-party entities. Moreover, once such information is known, the desired systems, apparatus and the like should provide for managing the communications from such devices, such that, a user can select to prohibit (i.e., block) or limit which data is communicated to which third-party entities. In addition, the desired systems, apparatus and the like should allow for the user to select additional third-party entities for data communication and select what data or data types are communicated to the additional third-party entities. Moreover, the desired systems, apparatus and the like should provide for authenticating/verifying the identity of third-party entities so that the user can be assured that data is being communicated to the intended third-party entity.

SUMMARY OF THE INVENTION

The following presents a simplified summary of one or more embodiments in order to provide a basic understanding of such embodiments. This summary is not an extensive overview of all contemplated embodiments, and is intended to neither identify key or critical elements of all embodiments, nor delineate the scope of any or all embodiments. Its sole purpose is to present some concepts of one or more embodiments in a simplified form as a prelude to the more detailed description that is presented later.

Embodiments of the present invention address the above needs and/or achieve other advantages by providing apparatus, systems, computer program products, for managing the communication of data from Internet-connected devices, such as those devices within an IoT environment. Specifically, the invention provides automated determination of which devices are communicating to which third-party entities and, in some embodiments the type of data being communicated to such third-party entities. Moreover, once such information is known, a user can manage the communications from such devices by selecting to prohibit (i.e., block) or limit, based on data type, which data is communicated to which third-party entities. Additionally, the invention provides for authenticating/verifying the identity of the third-party entities, such that if the entity cannot be verified, communication of data to the unverified entity is blocked. In addition, customized management allows for the user to select additional third-party entities for data communication and select what data or data types are communicated to the additional third-party entities.

A system for managing communications defines first embodiments of the invention. The system includes a plurality of devices associated with a user. Each of the devices are connected to the Internet and are configured to periodically, on an ongoing basis, communicate data associated with the device to one or more entities. The system additionally includes a computer platform including a memory and at least one processor in communication with the memory and a communications management module stored in the memory and executable by the processor. The communications management module includes a device polling sub-module that is configured to poll the plurality of devices to determine which entities each of the devices are communicating the data to. The communications management module additionally includes a communication management sub-module configured to, in response to determining which entities each of the devices are communicating the data to, manage communication of the data from the devices. Managing communication includes blocking transmission of at least a portion of the data communicated from one or more of the devices to at least one of the entities.

In specific embodiments of the system, the communication management sub-module is further configured to establish a plurality of entity categories, wherein each category is associated with an entity type and defines what type of data can be communicated to entities residing in the category. In such embodiments of the system, managing communication includes determining which entity category each of the entities belong to and placing each of the entities in the determined entity category. Placement of the entity in an entity category automatically manages types of data that can be communicated from the devices to the entities placed in the entity category.

In further specific embodiments of the system, the device polling sub-module is further configured to poll the plurality of devices to determine one or more types of data that are being communicated to each of the determined entities. In such embodiments of the system, the communication management sub-module is further configured to managing communication including blocking transmission of one or more of the types of data communicated from one or more of the devices to at least one of the entities.

In still further specific embodiments of the system, the device polling sub-module is further configured to identify one or more routers through which the plurality of devices connect to the Internet and poll the plurality of devices through the identified one or more routers. In such embodiments of the system, the communication management sub-module is further configured to manage communication of the data from the devices by blocking, at the one or more identified routers, transmission of the at least a portion of the data communicated from one or more of the devices to at least one of the entities.

In other specific embodiments of the system, the polling sub-module is further configured receive a user input that selects one or more of the devices and, in response to receiving the user input, to queries the selected one or more devices as to which entities the selected one or more devices are communicating the data to. In such embodiments of the invention, the communication management sub-module is further configured to manage communication by blocking transmission of the at least a portion of the data by re-configuring settings in the selected one or more of the devices that are communicating data to the at least one of the entities.

In yet other specific embodiments of the system, the communications management module further comprises an entity authentication sub-module that is configured to verify an identity of each of the determined entities. In such embodiments of the system, the communication management sub-module is further configured to, in response to the entity authentication sub-module determining that an identity of an entity cannot be verified, automatically block transmission of all data communicated from the devices to the entity.

Moreover, in further embodiments of the system, the communication management sub-module is further configured to manage communication of data from the devices, wherein managing communication includes adding at least one additional entity that at least one of the devices communicates data to. In such embodiments of the system, the communication management sub-module is further configured to manage communication by identifying one or more types of data to be communicated from the at least one of the devices to the at least one additional entity.

In other specific embodiments of the system, the communication management sub-module is further configured to manage communication of data from the devices by encrypting at least a portion of the data communicated from one or more of the devices to at least one of the entities.

An apparatus for managing communications defines second embodiments of the invention. The apparatus includes a computer platform includes a memory and at least one processor in communication with the memory. The apparatus further includes a communications management module that is stored in the memory and executable by the processor. The communications management module includes a device polling sub-module that is configured to poll a plurality of Internet-connected devices to determine which entities each of the devices are communicating device-related data to. The communications management module additionally includes a communication management sub-module that is configured to, in response to determining which entities each of the devices are communicating the data to, manage communication of the data from the devices. Managing communication comprises blocking transmission of at least a portion of the device-related data communicated from one or more of the Internet-connected devices to at least one of the entities.

A computer program product including a non-transitory computer-readable medium defines third embodiments of the invention. The computer-readable medium includes a first set of codes for causing a computer to poll a plurality of Internet-connected devices to determine which entities each of the devices are communicating device-related data to. The computer-readable medium includes a second set of codes for causing a computer to, in response to determining which entities each of the devices are communicating the data to, manage communication of the data from the devices. Managing communication comprises blocking transmission of at least a portion of the device-related data communicated from one or more of the Internet-connected devices to at least one of the entities.

Thus, systems, apparatus, methods, and computer program products herein described in detail below provide for managing the communication of data from Internet-connected devices, such as those devices within an IoT environment. Specifically, the invention provides automated determination of which devices are communicating to which third-party entities and, in some embodiments the type of data being communicated to such third-party entities. Once such information is known, a user can manage the communications from such devices by selecting to prohibit (i.e., block) or limit, based on data type, which data is communicated to which third-party entities. Additionally automated management of communications can occur, based on what third-party category the third-party entity falls under. Additionally, the invention provides for authenticating/verifying the identity of the third-party entities, such that if the entity cannot be verified, communication of data to the unverified entity is blocked. In addition, customized management allows for the user to select additional third-party entities for data communication and select what data or data types are communicated to the additional third-party entities.

To the accomplishment of the foregoing and related ends, the one or more embodiments comprise the features hereinafter fully described and particularly pointed out in the claims. The following description and the annexed drawings set forth in detail certain illustrative features of the one or more embodiments. These features are indicative, however, of but a few of the various ways in which the principles of various embodiments may be employed, and this description is intended to include all such embodiments and their equivalents.

BRIEF DESCRIPTION OF THE DRAWINGS

Figure 1:
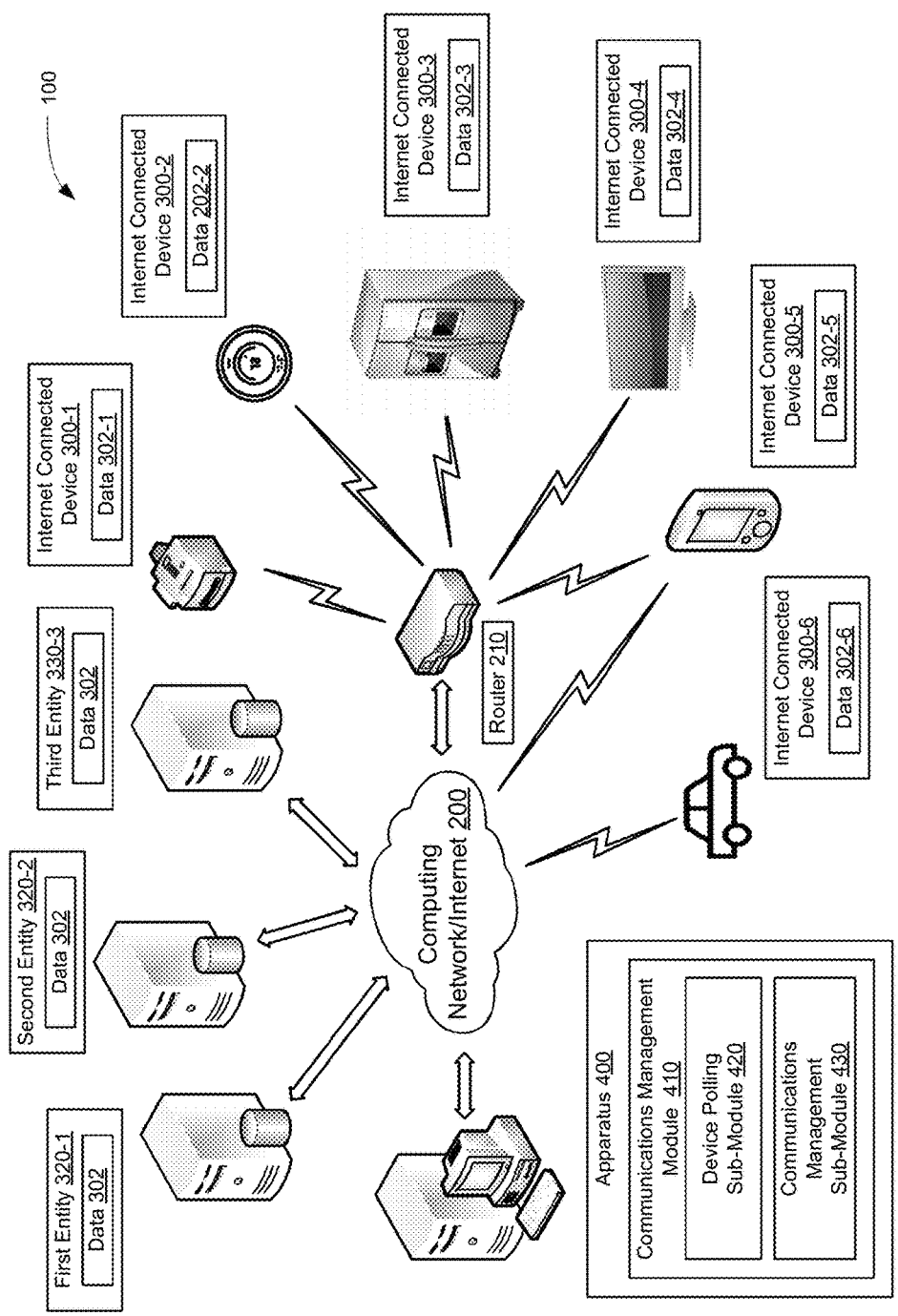
Figure 2:
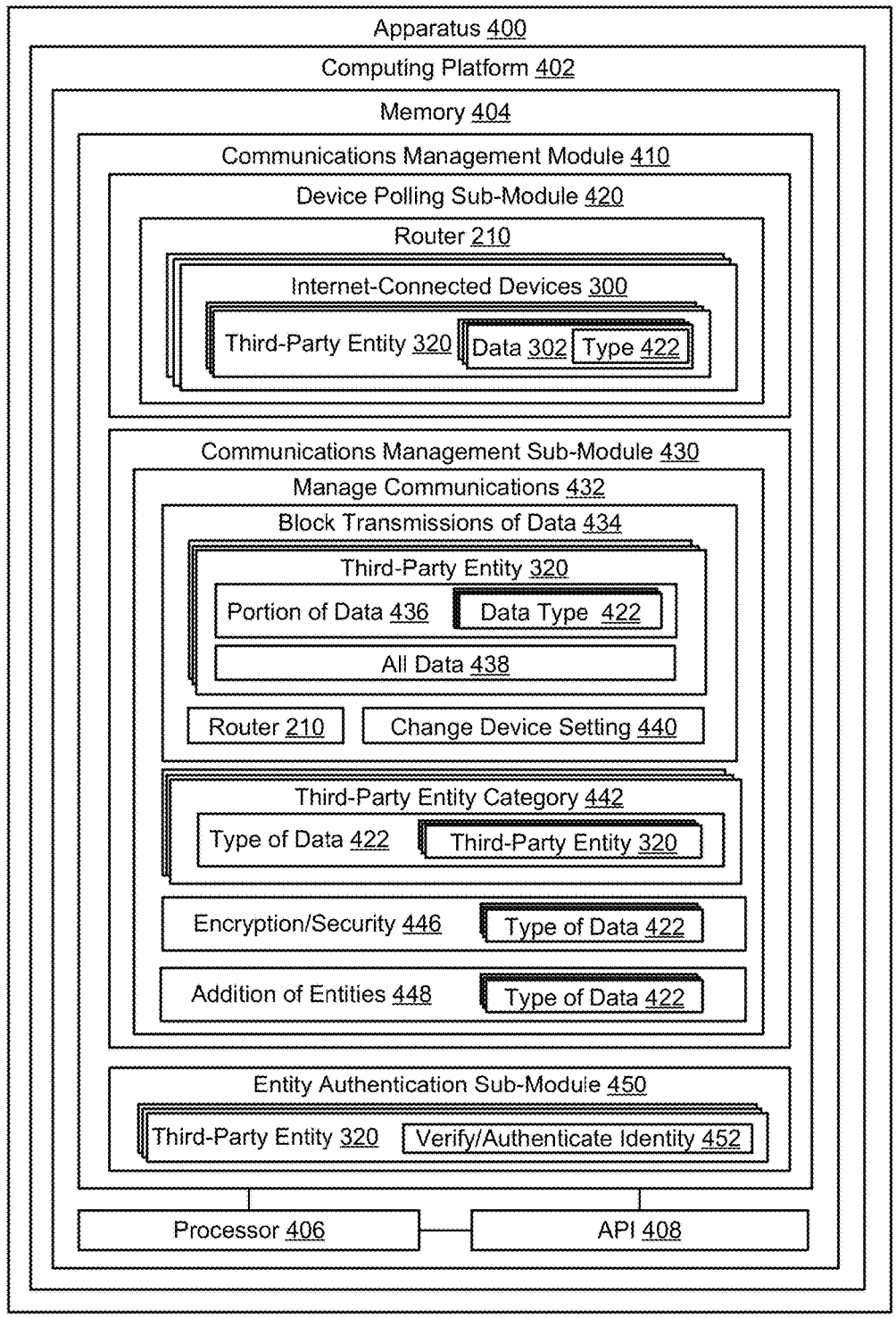

Having thus described embodiments of the invention in general terms, reference will now be made to the accompanying drawings, which are not necessarily drawn to scale, and wherein:

FIG. 1 provides a schematic diagram of an exemplary system for managing communications from Internet-connected devices in an Internet-of-Things (IOT) network environment, in accordance with embodiments of the present invention; and FIG. 2 provides a block diagram of an apparatus for managing communications from Internet-connected devices in an Internet-of-Things (IOT) network environment, in accordance with embodiments of the present invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout.

As will be appreciated by one of skill in the art in view of this disclosure, the present invention may be embodied as an apparatus (e.g., a system, computer program product, and/or other device), a method, or a combination of the foregoing. Accordingly, embodiments of the present invention may take the form of an entirely hardware embodiment, an entirely software embodiment (including firmware, resident software, micro-code, etc.), or an embodiment combining software and hardware aspects that may generally be referred to herein as a "system." Furthermore, embodiments of the present invention may take the form of a computer program product comprising a computer-usable storage medium having computer-usable program code/computer-readable instructions embodied in the medium.

Any suitable computer-usable or computer-readable medium may be utilized. The computer usable or computer-readable medium may be, for example but not limited to, an electronic, magnetic, optical, electromagnetic, infrared, or semiconductor system, apparatus, or device. More specific examples (e.g., a non-exhaustive list) of the computer-readable medium would include the following: an electrical connection having one or more wires; a tangible medium such as a portable computer diskette, a hard disk, a time-dependent access memory (RAM), a read-only memory (ROM), an erasable programmable read-only memory (EPROM or Flash memory), a compact disc read-only memory (CD-ROM), or other tangible optical or magnetic storage device.

Computer program code/computer-readable instructions for carrying out operations of embodiments of the present invention may be written in an object oriented, scripted or unscripted programming language such as JAVA, PERL, SMALLTALK, C++ or the like. However, the computer program code/computer-readable instructions for carrying out operations of the invention may also be written in conventional procedural programming languages, such as the "C" programming language or similar programming languages.

Embodiments of the present invention are described below with reference to flowchart illustrations and/or block diagrams of methods or apparatuses (the term "apparatus" including systems and computer program products). It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a particular machine, such that the instructions, which execute by the processor of the computer or other programmable data processing apparatus, create mechanisms for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instructions, which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions, which execute on the computer or other programmable apparatus, provide steps for implementing the functions/acts specified in the flowchart and/or block diagram block or blocks. Alternatively, computer program implemented steps or acts may be combined with operator or human implemented steps or acts in order to carry out an embodiment of the invention.

According to embodiments of the invention described herein, various systems, apparatus, methods, and computer program products are herein described for managing communication from Internet-connected devices (e.g., Internet-of-Things (IoT) devices) that communicate device-related information to third-party entities, such as, but not limited to, device manufacturers, warranty services, retailers and the like. The invention provides for polling the devices determine which third-party entities the devices are communicating data to. In specific embodiments of the invention the polling includes determining the type of data that the devices are communicating to the specific third-party entities. In other specific embodiments the polling includes polling one or more routers associated with the devices, such as router(s) as a user's residence or place of work, to determine the third-party entities that the devices are communicating data to.

Once the third-party entities and, in some embodiments the data types being communicated to the third-party entities are known, the invention further provides for managing the communications communicated from the devices to the third-party entities. In some embodiments third-party entity categories may be defined, either by the user or pre-designated, that define the type(s) of data that is authorized to be sent to the third-party entity. In such embodiments of the invention, a third-party entity may be automatically placed in one of the third-party categories, which automatically results in controlling the data that is communicated to the third-party entity. In other embodiments of the invention, a user may access a portal or the like, which allows for the user to observe which third-party entities devices are communicating data to and manage the communications accordingly (i.e., block third-party entities from receiving data, limit the third-party entity to certain data types, add security measures (e.g., encryption, access protection) to the data be being communicated, add additional data types for a third-party entity, add a third-party entity or the like). In other embodiments of the invention, managing the communications may include accessing the Internet-connected devices to re-configure the settings to block and/or limit communication of data to third-party entities.

Additionally, further embodiments of the invention provide for authenticating/verifying the third-party entities to insure that the third-party entities are who they purport to be. In the event that a third-party entity can be authenticated/verified the data communicated to the third-party entity may be blocked or limited.

Referring to FIG. 1, a schematic diagram is provided of a system 100 for managing communication of device-related data 302 from Internet-connected devices 300 to third-party entities 320, in accordance with embodiments of the present invention. The system 100 is implemented in a distributed computing environment via computing network 200, which includes the Internet and may include various sub-nets and/or intranets. System 100 includes apparatus 400 which stores communications management module 410, which is configured to manage the communication of data 302 1-6 being sent from Internet-connected devices 300 1-6 to one or more third-party entities 320. The Internet-connected devices 300 may be devices located within a user's residence or place of business, which connect to the Internet 200 via a router 210. The connection between the router 210 and the Internet-connected devices 300 1-5 may be wireless, as shown or in other instances the connection may be a physical/wired connection. The data 302 that is communicated is generally data associated with the Internet-connected device 300, such as performance data, warranty-related data, consumable accessory data and the like. In this regard, the third-party entities 320 1-3 may be any entity that has a use for such data 302, including, but not limited to, a manufacturer of the device, a warranty service, a retailer (for re-ordering consumable accessories associated with the device or the like) or the like.

In the illustrated embodiment of FIG. 1 the Internet-connected devices 300 include a multipurpose printer 300-1, a smart thermostat 300-2, a refrigerator 300-3, a television 300-4 and a mobile device/smart telephone 300-5, all of which may reside within a user's residence and communicate with the router 210 as the entry point to the Intranet 200. Additionally, the mobile device/smart telephone 300-5 and a vehicle 300-6 may be configured to communicate with the Intranet 200 directly (i.e., absent the router 210), such as through a cellular network or the like. Each of the Internet-connected devices 300 may have need to communicate data 302 to one or more third-party entities 320. For example, the data 302-1 communicated by the multipurpose printer 300-1 may include, but is not limited to, performance data to a manufacturer, warranty data to a warranty service and ink cartridge replacement orders to a retailer or the like. In such instances, the ink cartridge replacement order to the retailer may include a payment token or other payment credentials associated with the user/owner. While the user may desire for the payment token/credentials, such as a credit card account number or the like, to be communicated to a designated retailer, the user may not desire for the payment token/credentials to be communicated to other third-party entities, such as the manufacturer or warranty service.

The communications management module 410 of apparatus 400 includes a device polling sub-module 420 that is configured to poll the Internet-connected devices 300 to determine which third-party entities 320 the Internet-connected devices 300 are communicating data 302 to and, in some embodiments the type(s) of data 302 which the third-party entities 320 are receiving. In specific embodiment a user may interface with the communications management module 410, through a portal or the like, to identify their related Internet-connected devices 300 and, in some instances the user may also identify, if the user is aware, the third-party entities 320 and the type(s) of data 302 communicated the those third-party entities 320. However, in most instances, the user will be unaware of which third-party entities 320 are receiving the data 302 and unaware of the type of data 302 being received by the third-party entities 320. In which case, the device polling sub-module 420 is instrumental in determining/identifying the third-party entities 320 which are receiving data and, in specific embodiments, the type or types of data 302 which the third-party entities 320 are receiving. In specific embodiments of the invention, the device polling sub-module 420 is configured to poll the Internet-connected devices 300 directly to determine/identify the third-party entities 320 and, in some embodiments, the type(s) of data 302 being communicated to the third-party entities 320. While in other embodiments of the invention, the device polling sub-module 420 is configured to poll the router 210 to determine/identify third-party entities 320 and, in some embodiments, the type(s) of data 302 being communicated to the third-party entities 320. In accordance with embodiments of the present invention, polling the router 210 may additionally provide for identifying Internet-connected devices 300 in those instances in which a user has not identified an Internet-connect device 300, such as a newly acquired Internet-connected device 300 or the like.

Communications management module 410 additionally includes communications management sub-module 430 that is configured to, in response to determining which third-part entities 320 each of the Internet-connected devices 300 are communicating the data 302 to, manage communication of the data 302 from the Internet-connected devices 300. In specific embodiments of the invention, managing communication includes blocking transmission of at least a portion of the data 302 communicated from one or more of the Internet-connected devices 300 to at least one of the third-party entities 320. In other specific embodiments of the invention, the communications management sub-module 430 is further configured to block transmission of specified types of data 302 communicated from one or more of the Internet-connected devices 300 to at least one of the third-party entities 320. For example, manufacturers or warranty services may be blocked from receiving payment tokens/credentials or the like.

In specific embodiments of the invention, the sub-module 430 may be configured or the user may configure third-party entity categories, such that a category defines the type(s) of data that a third-party can receive. In such instances, the communications management sub-module 430 may be configured to identify which category each of the third-party entities 320 and place each of the third-party entities 320 in the identified category. Once the third-party entity is placed in a category, the communications management sub-module automatically blocks/filters data type(s) that are not configured for transmission to a third-party entity 320 residing in that particular category.

In other embodiments of the invention, a user may access a portal or the like associated with the communications management sub-module 430 to configure data communications to each of the identified third-party entities 320. Such configuration may include blocking all transmissions to one or more third-party entities 320 or identifying which type of data 302 is authorized to be communicated to a specific third-party entity. In other embodiments of the invention, the user may configure the sub-module 430 to notify/alert the user, via text message or the like, each time a specified Internet-connected device attempts a data communication or each time a specified third-party entity is designated for data communication or each time a specified data type (e.g., payment token/credentials) is designated for data communication. In this regard, the communications management sub-module 430 may allow for dynamic communications management by the user on either a per-device basis, a per-third-party entity basis and/or a per-data type basis.

In further embodiments of the invention, the communications management sub-module 430 is configured to allow users to add additional third-party entities as recipients of data 302 from one or more of the Internet-connected devices 300 and, in certain embodiments, define the type(s) of data that the additional third-party entity is authorized to receive.

Management of communications may occur at the Internet-connected device 300-level and/or at the router 210-level. In this regard, the communications management sub-module 430 may access the Internet-connected devices 300 and reconfigure settings on the Internet connected device 300 that define the third-party entities 320 and, in some embodiments, the type(s) of data 302 that the third-party entities 320 are configured to receive. In such embodiments, the communications management sub-module 430 may access the settings in the Internet-connected device 300 to delete or add a third-party entity 320 and/or delete or add to the type(s) of data 302 that a third-party entity 320 may receive. In other embodiments of the invention, the communications management sub-module 430 may access the router 210 to block transmissions to a third-party entity 320.

Referring to FIG. 2 a block diagram is presented of the apparatus 400, which is configured for managing communication of data from Internet-connected devices to third-party entities, in accordance with embodiments of the present invention. In addition to providing greater detail, FIG. 2 highlights various alternate embodiments of the invention. The apparatus 400 may include one or more of any type of computing device, such as one or more servers, personal computers or the like. The present apparatus and methods can accordingly be performed on any form of one or more computing devices.

The apparatus 400 includes a computing platform 402 that can receive and execute algorithms, such as routines, and applications. Computing platform 402 includes memory 404, which may comprise volatile and non-volatile memory, such as read-only and/or random-access memory (RAM and ROM), EPROM, EEPROM, flash cards, or any memory common to computer platforms. Further, memory 404 may include one or more flash memory cells, or may be any secondary or tertiary storage device, such as magnetic media, optical media, tape, or soft or hard disk. Moreover, memory 404 may comprise cloud storage, such as provided by a cloud storage service and/or a cloud connection service.

Further, computing platform 402 also includes processor 406, which may be an application-specific integrated circuit ("ASIC"), or other chipset, processor, logic circuit, or other data processing device. Processor 406 or other processor such as ASIC may execute an application programming interface ("API") 408 that interfaces with any resident programs, such as communications management module 410 and routines, sub-modules associated therewith or the like stored in the memory 404 of the apparatus 400.

Processor 406 includes various processing subsystems (not shown in FIG. 2) embodied in hardware, firmware, software, and combinations thereof, that enable the functionality of apparatus 400 and the operability of the apparatus on a network. For example, processing subsystems allow for initiating and maintaining communications and exchanging data with other networked devices, such as those apparatus, databases and repositories shown in FIG. 1. For the disclosed aspects, processing subsystems of processor 406 may include any subsystem used in conjunction with communications management module 410 and related algorithms, sub-algorithms, modules, sub-modules thereof.

Computer platform 402 may additionally include communications module (not shown in FIG. 2) embodied in hardware, firmware, software, and combinations thereof, that enables communications among the various components of the apparatus 400, as well as between the other networked devices. Thus, communication module may include the requisite hardware, firmware, software and/or combinations thereof for establishing and maintaining a network communication connection.

The memory 404 of apparatus 400 stores communications management module 410, which is configured to manage communication of data 302 between Internet-connected devices 300 and third-party entities 320, in accordance with embodiments of the invention. The module 410 includes device polling sub-module 420 that is configured to poll a plurality of Internet-connected devices 300 to determine which entities, such as third-party entities 320 that the devices are communicating device-related data 302 to. In specific embodiment of the invention, the module 410 provides a user-interface, such as a portal, which a user can access to identify their specific Internet-connected devices 300. Identification may include a network path for polling such devices 300, such as an IP address associated with the device or the like. In such embodiments, polling the Internet-connected devices 300 to determine which third-party entities 320 the devices are communicating data 302 to may include determining the IP addresses or some other address that the Internet-connected devices 300 are communicating the data 302 to. Once the IP addresses or other addresses are known, the polling sub-module may be able to decipher the entity from the address (in instances in which the address identifies the entity) or implement an Internet-based lookup table to determine the entity associated with the IP address.

In other specific embodiments of the apparatus, the device polling sub-module 420 is configured to determine the types 422 of data 302 being communicated from the Internet-connected devices 300 to the third-party entities. The types of data may include, but are not limited to, performance data, such as data accumulated from device sensors or the like; user data, such as personal data (e.g., name, address, telephone number) as well as payment tokens/credentials associated with the user (e.g., credit card account numbers or the like) or the like. The type 422 of data 302 may be identifiable within a device's settings or the device polling sub-module 420 may be configured to analyze the payloads of one or more communications being sent to the third-party entities to determine what types 422 of data 302 are being communicated.

In other specific embodiments of the apparatus 400, the device polling sub-module 420 is configured to poll the router 210 or some other gateway device through which the Internet-connected devices 300 gain entry to the Internet 200. In such embodiments of the invention, a user may identify (e.g., provide the IP address or the like) the router 210 located at their residence or place of business and the device polling sub-module 420 may access the router 210 to determine when communications are being sent from the Internet-connected devices 300 and the destinations of such communications (e.g., the IP address or other address in the header of the communications that directly or indirectly identify the recipient (i.e., the third-party entity 320)). Moreover, the type 422 of data 302 may be identified by analyzing the payloads of one or more communications being routed through the router 210 to determine what types 422 of data 302 are being communicated to the third-party entities 320.

The communications management module 410 additionally includes a communications management sub-module 430 that is configured to manage communications 432 of data 302 from the Internet-connected devices 300 to the third-party entities 320. In specific embodiments of the invention, the communications management sub-module 430 is configured to manage the communications 432 by blocking transmission 434 of at all data 438 or a portion of the data 436 that would otherwise be communicated to the third-party entity 320. In those embodiments in which the blocking of transmissions 434 occurs on a portion of the data 436, the portion that is blocked may be based on the type 422 of the data 302. For example, a manufacturer may be blocked from receiving anything but device performance data (i.e., personal/user data is blocked from being transmitted to the manufacturer). In specific embodiments of the invention, the communications management sub-module may access the router 210 to block transmission 434 of data 302, while in other embodiments of the invention, the communications management sub-module 430 may access the Internet-connected devices 300 directly to reconfigure the settings in the device to prevent data 302 from being communicated to a specific third-party entity 320 or prevent one or more specific types 422 of the data 302 from being communicated to a specific third-party entity 320.

As previously discussed, the communications management sub-module 430 may be configured to with third-party entity categories 442 or a user may define third-party entities categories 442 within the module 410. A category 442 defines the type(s) 422 of data 302 that a third-party 320 can receive. In such instances, the communications management sub-module 430 is configured to identify which category 442 each of the third-party entities 320 belong to and place each of the third-party entities 320 in the identified category 442. Once the third-party entity 320 is placed in a category 442, either automatically by the sub-module 430 or via user action, the communications management sub-module 430 automatically blocks/filters data type(s) that are not configured for transmission to a third-party entity 320 residing in that particular category.

In other embodiments of the invention, a user may access a portal or the like associated with the communications management sub-module 430 to configure data communications to each of the identified third-party entities 320. Such configuration may include blocking all transmissions to one or more third-party entities 320 or identifying which type of data 302 is authorized to be communicated to a specific third-party entity. In other embodiments of the invention, the user may configure the sub-module 430 to notify/alert the user, via text message or the like, each time a specified Internet-connected device attempts a data communication or each time a specified third-party entity is designated for data communication or each time a specified data type (e.g., payment token/credentials) is designated for data communication. In this regard, the communications management sub-module 430 may allow for dynamic communications management by the user on either a per-device basis, a per-third-party entity basis and/or a per-data type basis.

The communications management sub-module 430 may also be configured to allow for automatic or user configured security levels or features 446, such as encryption/password protection or the like to be added to data 302 communicated from the Internet-connected devices 300 to the third-party entities. In specific embodiments of the invention, the third-party entity categories 442 may further define security levels or features 446 to be executed on data 302 communicated to the third-party entities 320 in the designated category 442. In other embodiments of the invention, the user may choose which security level or features 446 to apply to chosen third-party entities 320 or to chosen types 422 of data 302 communicated to a chosen third-party entity 320.

In further embodiments of the invention, the communications management sub-module 430 is configured to allow users to add additional third-party entities as recipients of data 302 from one or more of the Internet-connected devices 300 and, in certain embodiments, define the type(s) of data that the additional third-party entity is authorized to receive. Addition of third-party entities 320 may require the communications management sub-module 430 to access the settings in the Internet-connected device 300 to add an additional third-party entity 320 or data type 422.

Additionally, in alternate embodiments of the invention, the communications management module 410 may include an entity authentication sub-module 450 that is configured to verify/authenticate the identity 452 third-entities 320 to insure that the entity is, in fact, who they purport to be. In other words, the entity authentication sub-module 450 is configured to verify that the IP address or other address to which the data 302 is to be communicated to is the actual address of the third-party entity and not a spoofed address or the like. Verification of the IP address or other address may entail accessing a look-up table of verified IP addresses or other address or using other known or future known verification/authentication techniques.

To supplement the present disclosure, this application further incorporates entirely by reference the following commonly assigned patent applications:

| Docket Number | U.S. patent application Ser. No. | Title | Filed On |
|---|---|---|---|
| 7065US1.014033.2722 | To be assigned | Enhancing Authentication and Source of Proof Through a Dynamically Updateable Biometrics Database | Concurrently herewith |
| 7086US1.014033.2723 | To be assigned | Resource Tag Generation and Resource Valuation for Deployment for Resource Distribution | Concurrently herewith |
| 7089US1.014033.2724 | To be assigned | System for Real-Time Release of Allocated Resources Based on Device Stage | Concurrently herewith |
| 7090US1.014033.2725 | To be assigned | Security Implementation for Resource Distribution | Concurrently herewith |
| 7097US1.014033.2726 | To be assigned | Security Implementation for User Resource Distribution with Peripheral Device | Concurrently herewith |
| 7098US1.014033.2727 | To be assigned | Intelligent Resource Procurement System based on Physical Proximity to Related Resources | Concurrently herewith |
| 7082US1.014033.2728 | To be assigned | System for Machine-Initiated Resource Generation and Customization | Concurrently herewith |
| 7083US1.014033.2729 | To be assigned | Security Implementation for User Resource Distribution | Concurrently herewith |

Thus, systems, apparatus, methods, and computer program products described above provide for managing communication of data from Internet-connected devices, such as those devices within an IoT environment. Specifically, the invention provides automated determination of which devices are communicating to which third-party entities and, in some embodiments, the type of data being communicated to such third-party entities. Once such information is known, the third-party entity can be automatically placed into a designated third-party category, which defines the type of data that the third-party entity is authorized to receive. In addition, a user can manage the communications from such devices by selecting to prohibit (i.e., block) or limit, based on data type, which data is communicated to which third-party entities. Additionally, the identity of the third-party entities can be authenticated/verified, such that if the third-party entity cannot be verified, communication of data to that entity is blocked or limited. Moreover, a user can add additional third-party entities for a specified device and define the type of data which may be communicated from the device to the third-party entity.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible.

Those skilled in the art may appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A system for managing communications, the system comprising:
    a plurality of devices associated with a user, wherein each of the devices are connected to the Internet and communicate data associated with the device to one or more entities; and
    a computer platform including a memory device with computer-readable code stored thereon and at least one processor device in communication with the memory device, wherein executing the computer-readable code is configured to cause the at least one processor device to:
    establish a plurality of entity categories, wherein each category is associated with an entity type and defines what types of data can and cannot be communicated to entities residing in the category,
    poll the plurality of the devices to determine which IP addresses each of the devices are communicating the data to and determine an entity associated with each of the IP addresses, and
    in response to determining which entities each of the devices are communicating the data to, manage communication of the data from the devices, wherein managing communication comprises:
    determining which entity category each of the entities belong to and placing each of the entities in the determined entity category, wherein placement of the entity in an entity category automatically manages what type of data can and cannot be communicated from the devices to the entities placed in the entity category, wherein automatically managing what type of data that cannot be communicated from the devices to the entities includes:
    reconfiguring settings in one or more of the devices to block transmission of a portion of the data communicated from the one or more of the devices to at least one of the determined entities, wherein the portion of the data that is blocked is based the type of data that cannot be communicated to the at least one determined entity as defined by the entity category determined for the at least one determined entity.

2. The system of claim 1, wherein the computer-readable code is further configured to cause the at least one processor device to poll the plurality of devices to determine one or more types of data that are being communicated to each of the determined entities.

3. The system of claim 2, wherein the computer-readable code is further configured to cause the at least one processor device to, in response to determining which entities each of the devices are communicating the data to, manage communication of the data from the devices, wherein managing communication comprises blocking transmission of one or more of the types of data communicated from one or more of the devices to at least one of the entities.

4. The system of claim 1, wherein the computer-readable code is further configured to cause the at least one processor device to identify one or more routers through which the plurality of devices connect to the Internet and poll the plurality of devices through the identified one or more routers.

5. The system of claim 4, wherein the computer-readable code is further configured to cause the at least one processor device to manage communication of the data from the devices, wherein managing communication comprises blocking, at the one or more identified routers, transmission of the at least a portion of the data communicated from one or more of the devices to at least one of the entities.

6. The system of claim 1, wherein the computer-readable code is further configured to cause the at least one processor device to receive a user input that selects one or more of the devices and, in response to receiving the user input, queries the selected one or more devices as to which entities the selected one or more devices are communicating the data to.

7. The system of claim 1, wherein the computer-readable code is further configured to cause the at least one processor device to verify an identity of each of the determined entities.

8. The system of claim 7, wherein the computer-readable code is further configured to cause the at least one processor device to, in response to determining that an identity of an entity cannot be verified, automatically block transmission of all data communicated from the devices to the entity.

9. The system of claim 1, wherein the computer-readable code is further configured to cause the at least one processor device to manage communication of data from the devices, wherein managing communication includes adding at least one additional entity that at least one of the devices communicates data to.

10. The system of claim 9, wherein the computer-readable code is further configured to cause the at least one processor device to manage communication of data from the devices, wherein managing communication includes identifying one or more types of data to be communicated from the at least one of the devices to the at least one additional entity.

11. The system of claim 1, wherein the computer-readable code is further configured to cause the at least one processor device to manage communication of data from the devices, wherein managing communication includes encrypting at least a portion of the data communicated from one or more of the devices to at least one of the entities.

12. An apparatus for managing communications, the apparatus comprising:
    a computer platform including:
        a memory device with computer-readable code stored thereon; and
        at least one processor device in communication with the memory device,
            wherein executing the computer-readable code is configured to cause the at least one processor device to:

establish a plurality of entity categories, wherein each category is associated with an entity type and defines what types of data can and cannot be communicated to entities residing in the category, poll a plurality of Internet-connected devices to determine which IP addresses each of the devices are communicating device-related data to and determine an entity associated with each of the IP addresses, and manage communication of the data from the devices, wherein managing communication comprises:

determining which entity category each of the entities belong to and placing each of the entities in the determined entity category, wherein placement of the entity in an entity category automatically manages what type of data can and cannot be communicated from the devices to the entities placed in the entity category, wherein automatically managing what type of data that cannot be communicated from the devices to the entities includes:

reconfiguring settings in one or more of the devices to block transmission of a portion of the data communicated from the one or more of the devices to at least one of the determined entities, wherein the portion of the data that is blocked is based the type of data that cannot be communicated to the at least one determined entity as defined by the entity category determined for the at least one determined entity.

13. The apparatus of claim 12, wherein the computer-readable code is further configured to cause the at least one processor device to poll the plurality of devices to determine one or more types of data that are being communicated to each of the determined entities and in response to determining which entities each of the devices are communicating the data to, manage communication of the data from the devices, wherein managing communication comprises blocking transmission of one or more of the types of data communicated from one or more of the devices to at least one of the entities.

14. A computer program product including a non-transitory computer-readable medium, the computer-readable medium comprising multiple sets of codes which, when extended by a computer, cause the computer to:

establish a plurality of entity categories, wherein each category is associated with an entity type and defines what types of data can and cannot be communicated to entities residing in the category;

poll a plurality of Internet-connected devices to determine which IP addresses each of the devices are communicating device-related data to and determine an entity associated with each of the IP addresses; and in response to determining which entities each of the devices are communicating the data to, manage communication of the data from the devices, wherein managing communication comprises:

determining which entity category each of the entities belong to and placing each of the entities in the determined entity category, wherein placement of the entity in an entity category automatically manages what type of data can and cannot be communicated from the devices to the entities placed in the entity category, wherein automatically managing what type of data that cannot be communicated from the devices to the entities includes:

reconfiguring settings in one or more of the devices to block transmission of a portion of the data communicated from the one or more of the devices to at least one of the determined entities, wherein the portion of the data that is blocked is based the type of data that cannot be communicated to the at least one determined entity as defined by the entity category determined for the at least one determined entity.

15. The computer program product of claim 14, wherein the first set of codes is further configured to cause the computer to poll the plurality of devices to determine one or more types of data that are being communicated to each of the determined entities and wherein the second set of codes is further configured to cause the computer to, in response to determining which entities each of the devices are communicating the data to, manage communication of the data from the devices, wherein managing communication comprises blocking transmission of one or more of the types of data communicated from one or more of the devices to at least one of the entities.

* * * * *